Aug. 7, 1951 G. H. BROWN 2,563,098

HIGH FREQUENCY DIELECTRIC HEATING SYSTEMS

Filed Aug. 31, 1948

INVENTOR
GEORGE H. BROWN
BY
Morris A. Rabkin
ATTORNEY

Patented Aug. 7, 1951

2,563,098

UNITED STATES PATENT OFFICE 2,563,098

HIGH-FREQUENCY DIELECTRIC HEATING SYSTEM

George H. Brown, Princeton, N. J., assignor to Radio Corporation of America, a corporation of Delaware Application August 31, 1948, Serial No. 47,035

4 Claims. (Cl. 219—47)

Figure 1:
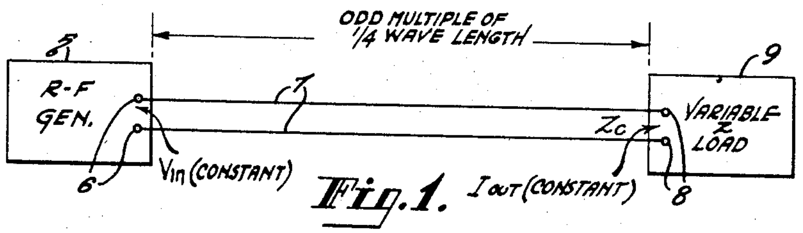

The present invention relates to systems for heating and bonding thermoplastic dielectric materials in the presence of suitable high frequency electrostatic fields. The heating of the material is effected by dielectric loss resulting from the electrostatic stressing of the material in a field of sufficient intensity, usually determined by the R.-F. voltage applied, to provide the required degree of heating in the time available for the heating operation, which is dependent upon the speed of travel of the material through the field.

Thermoplastic dielectric materials in thin sheets are useful in the fabrication of waterproof coverings, air-tight enclosures, and packages for the shipment and storage of foods, chemicals or other materials which deteriorate in the presence of air or moisture. It is customary to seal materials of this type by passing superimposed layers between suitable electrodal means connected with a source of high frequency power, such as an oscillation generator, to bring the material to a point of plasticity by the resultant dielectric loss therein, and to permit bonding thereof under pressure. Continuous seams or joints between one or more sheets of thermoplastic dielectric material may be made by passing the sheets, with overlapping edges, between suitable roller electrodes. The advantages of applying radio frequency power to dielectric materials held between bar or roller electrodes have been pointed out in an article by C. N. Hoyler in "Electronics" magazine for August, 1943, entitled "An electronic sewing machine."

Commercial applications of electronic heating and bonding by utilizing high frequency electrostatic fields for the generation of heat in dielectric materials frequently require the bonding of seams in which a plurality of layers of material pass between the electrodes at one time and relatively few layers of the material pass between the electrodes at other times, thereby providing a variable impedance load which, for uniform heating of the material, must be compensated.

Such operation causes a variation in the spacing of, and thus the capacity between, the opposed electrodes, thereby varying the power input to the work load and, in some cases, the tuning of the normally resonant radio frequency supply circuit of which the electrodes are a part. In some commercial applications from two to eight layers may be required to pass between the electrodes in the process of bonding or "sewing" thermoplastic materials, for example as in the production of garments, and particularly in the bonding of seams and joints between the various portions to be fabricated into a unit.

The variation in thickness of the material as well as in the dielectric constant of the various materials used, makes it necessary, normally, to provide adjustments in the voltages applied to the electrodes. Under such conditions, heretofore, it has been considered desirable to maintain a constant load on the power source or generator while maintaining a constant voltage across the work load or between the electrodes.

It has been found, however, that in accordance with the invention, more uniform heating and bonding of dielectric materials, forming the work load of a high frequency dielectric heating system, may be provided when the current through the load is maintained substantially constant regardless of variations in the load caused by variations in the thickness or the number of layers of the material passing between the electrodes, or by the dielectric constant variations occasioned by the use of different materials.

In certain prior known electronic heating systems, to maintain the voltage constant at the load or across the load capacity and inductance, a transmission line of suitable length is provided between the generator or oscillator and the electrodes through which the electrostatic field is applied to the load or dielectric material to be heated, and the current is maintained substantially constant at the generator end of the line through the medium of an impedance introduced into the circuit. A constant voltage at the load end is then maintained, regardless of variations in the thickness of the material being processed, by the use of a one-quarter wave line or the equivalent. It will be seen that such a system does not maintain the same power input to the material with variations in thickness, although the load current at the generator is substantially uniform under such conditions.

It is an object of this invention, therefore, to provide a more effective high frequency dielectric heating system which operates to maintain substantially a constant voltage input to the transmission line or at the input terminals of the line, while maintaining substantially a constant current through the work load regardless of variations in the thickness or of the dielectric constant of the work material passing between the electrodal means by which the high frequency power is applied to the work load.

It is further desirable to control the load current automatically as the material varies in dielectric constant or thickness and, accordingly, it is a further object of this invention, to provide an improved high frequency dielectric heating system which automatically maintains the high frequency current between the electrodes and through the load at substantially a constant value regardless of load variations, such as variations in the thickness of the dielectric material or the number of layers thereof passing between the electrodes.

It is also an object of this invention, to provide an improved high frequency dielectric heating system which is readily applicable to electronic bonding apparatus such as electronic sewing machines and the like for the continuous uniting of a plurality of layers of thin thermoplastic sheet dielectric material, the layers of which may vary in number or thickness, to provide uniform uniting or bonding of the layers.

More specifically, it is an object of this invention, to provide an improved high frequency dielectric heating system having a circuit arrangement which permits a differing number of layers of dielectric material to pass between energized high frequency electrodes, without manual adjustment of the power applied to the material, while at the same time obtaining uniform heating or bonding of the varying layers of material.

In accordance with the invention, a reversal of known prior art circuit arrangements provides a constant voltage at the input end of a transmission line, which is an odd multiple of one-quarter wavelength, and a constant current at the output end thereof through the load regardless of load variations, as aforementioned.

In one form of the invention, an output coupling transformer is provided for the oscillation generator or R.-F. power source, having loose coupling between the primary and secondary thereof and including a series tuning capacitor in the secondary circuit, whereby, with the secondary, a series tuned circuit is provided across which the output voltage from the generator is maintained constant at the input end of the quarter wave line, or the equivalent thereof, leading to the load.

The series tuning capacitor with the secondary, tunes out the leakage reactance, so that as the current in the secondary circuit varies, the voltage across the series tuned circuit remains constant. With the quarter wave line or its equivalent, the current at the load remains substantially constant regardless of variations in the load, occasioned for example, by variations in the thickness of the material passing between the electrodes connected with the output end of the transmission line.

Thus if the voltage at the power source is maintained substantially 90 electrical degrees away from the voltage at the load, then the load current may be maintained substantially constant if the voltage at the source is maintained constant, regardless of variations in the impedance of the load. The substantially constant voltage at the source may be obtained through the use of certain coupling circuits and a generator having high reserve power, and such generators are now available for providing sufficiently large amounts of power for effective electronic heating and bonding of thermoplastic dielectric materials.

The system, therefore, operates in a manner substantially opposite from previously known systems which maintain the voltage across the load substantially constant. Under the present system, the voltage across the load is permitted to vary while the current remains constant in the presence of load impedance variations, thereby maintaining substantially uniform heating and bonding of the materials as the material may vary in dielectric constant or thickness or in the number of layers passing through the electrostatic field between the heating electrodes.

Figure 2:
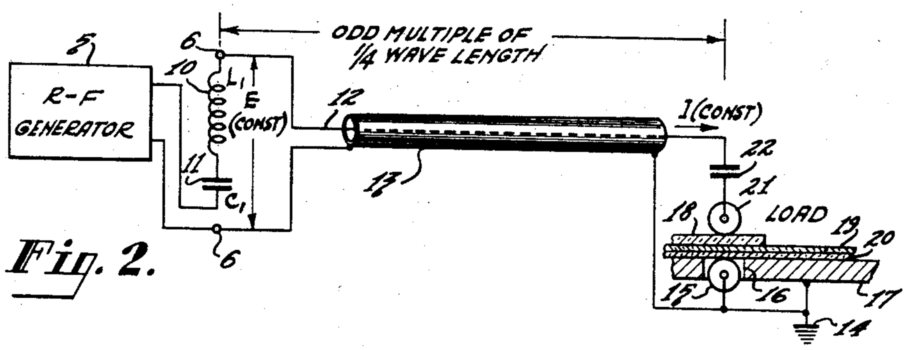
Figure 3:
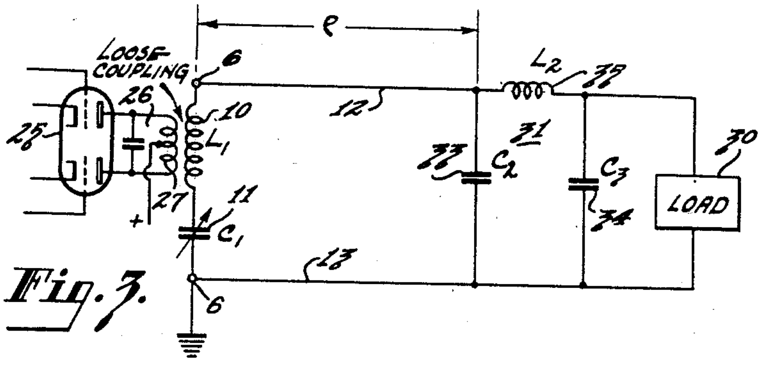
Figure 4:
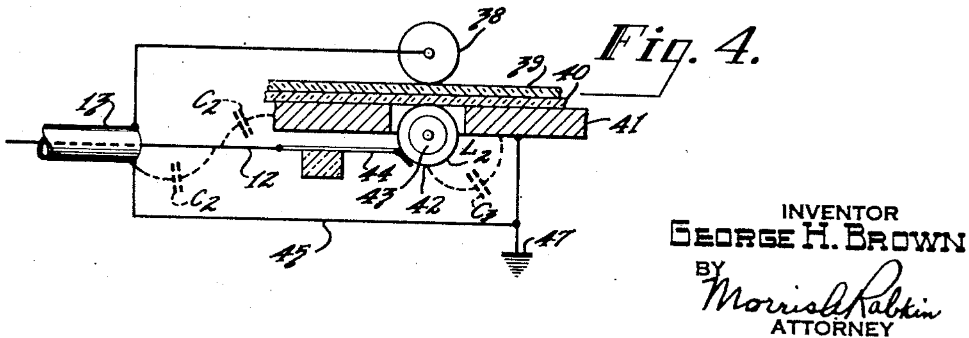

The novel features that are considered characteristic of the invention are set forth with particularity in the appended claims. The invention itself, however, both as to its organization and method of operation, as well as additional objects and advantages thereof, will best be understood from the following description of various embodiments thereof when read in connection with the accompanying drawing, in which Figure 1 is a schematic circuit diagram of a high frequency generator and load circuit adapted for dielectric heating in accordance with the invention, Figure 2 is a further schematic circuit diagram of a high frequency dielectric heating system embodying the invention, certain of the components being shown partially in cross-section, Figure 3 is a circuit diagram showing a modification of the system of Figure 2 to illustrate certain features of the invention, and Figure 4 is a view in elevation and partly in cross section, showing a further modification of a portion of the system of Figure 2 for operation in accordance with the circuit of Figures 2 and 3.

Referring to Figure 1, a constant voltage R.-F. generator or high frequency power source 5 is connected with high frequency power input terminals 6 for the input end of a transmission line 7, which may be an odd multiple of ¼ wavelength long, as indicated. The output terminals 8 of the transmission line are connected to a variable impedance load 9 for the generator, and the system operates to provide a constant current, $I_{out}$ from the line through the load in response to the constant voltage, $V_{in}$, applied to the input end of the line as indicated.

If it is assumed that a variable impedance work load in a radio frequency sewing machine, for example, for uniting thermoplastic sheet materials, is moved at a speed sufficiently high so that no appreciable energy is lost by heat conduction into the electrodes or other means by which the energy is applied to the work load, for a certain current, I, through the material, it may be assumed that a voltage, $e$, may be required. If the number of layers of material doubles in thickness, then the voltage across the load becomes $2e$, and the same current I flows, with each cubic unit of material receiving the same amount of power. Under these conditions, constancy of the current, I, is important if it is required to bond two or three or more layers of material without readjusting the power of the generator as each new thickness approaches.

In the circuit of Figure 1, which provides for operation in accordance with the foregoing conditions, by ordinary transmission line equations, $$V_{in}=V_{out}\cos\rho+jI_{out}Z_c\sin\rho \qquad (1)$$

where $Z_c$=the characteristic impedance of the transmission line, and $\rho$=the length of the actual transmission line, or $$\rho=2x/\lambda \text{ radians}=360x/\lambda \text{ degrees} \qquad (1a)$$

or $$V_{in}=I_{out}Z_{out}\cos\rho+jI_{out}Z_c\sin\rho \qquad (2)$$

If the transmission line is made ¼ wavelength long with respect to the applied high frequency power, so that $\rho$ is equal to 90°, then Equation 2 above becomes $$V_{in}=jI_{out}Z_c \qquad (3)$$

and the output current will now be entirely independent of the load impedance.

It may be observed that the transmission line may be an odd multiple of a quarter wavelength of the applied operating frequency to achieve this condition. Thus, if the input voltage $V_{in}$ is constant, the load current $I_{out}$ will also be constant. It is the constancy of the input voltage that then becomes important. In addition to having an adequate power supply of proper capacity, it is further necessary to provide means for maintaining the voltage at the input terminals of the transmission line substantially constant at all conditions of variable load. A circuit providing for such operation is shown in Figure 2, to which attention is now directed.

In Figure 2 the R.-F. constant voltage generator 5 is coupled to the terminals 6—6 of the transmission line through a series inductance 10 and a series capacitance 11 in one side of the generator output connection. These are referred to as inductance $L_1$ and capacitance $C_1$. If the capacitance and inductance are in series resonance at the operating or applied frequency, the generator voltage will then also appear at the input terminals 6 of the transmission line.

In the present example, the transmission line is shown as a central conductor 12 and an outer shield conductor 13 therefor connected to ground 14 and to a lower roller electrode 15. The latter is positioned in an opening 16 in a platen or table 17 on which a work load comprising a plurality of layers of thin sheet dielectric material 18, 19 and 20 are progressively moved between the electrode 15 and an upper electrode 21, connected through a coupling capacitor 22 to the central conductor 12 of the transmission line.

Such an arrangement may be provided in electric bonding apparatus such as an electric sewing machine, where the upper electrode is movable toward and away from the electrode 15 to apply pressure to the dielectric material between it and the lower electrode, to set up an electrostatic field in the material of sufficient intensity to effect heating and bonding of the various layers by reason of the dielectric loss in the material.

It will be seen that as the layers between the electrodes vary as in the present example, the capacity between the electrodes will likewise vary, tending to cause a change in the heating effect upon the material. However, as the current, I, is held constant regardless of variations in thickness, the same effective heating and bonding of the material will result.

If the circuit of Figure 2 is arranged to be coupled to the output of the generator 5 or other power source through a coupling transformer, and the circuit of Figure 2 is otherwise rearranged for shortening the length of the transmission line to less than ¼ wavelength of the operating frequency as may be desirable in certain cases, a circuit as shown in Figure 3 may be provided and is now referred to along with Figure 2 for a further consideration of the modification and certain features of Figure 2. Like circuit elements in each figure are referred to by like reference characters.

In Figure 3 an oscillator 25, which may be the operating element of the R.-F. generator 5, is provided with tuned output tank circuit 26 having a coupling inductance 27 which is loosely inductively coupled to the inductance 10 or $L_1$, to provide an output coupling transformer arrangement. The inductance 10 operates as a pickup coil for the energy derived from the generator, and is resonated by the series capacitor 11 which may be variable as shown, to tune the inductance substantially to resonance with the generator frequency. Then if the coupling is sufficiently loose so that the voltage induced in the pickup coil or winding 10 does not change with changes of load, the current in the load, indicated at 30, will be constant as the load impedance changes.

For this condition, two items are of primary importance. First, the voltage at the input end of the transmission line between the terminals 6 must be constant and, second, the transmission line must be a quarter-wave long or an odd multiple of a quarter wavelength.

With this arrangement, a series tuned circuit is provided across which the output voltage from the generator is maintained constant at the input end of the quarter wave line, or the equivalent thereof, leading to the load. The series tuning capacity $C_1$ comprising the capacitor 11, with the secondary 10 as the series inductance element $L_1$, provides for tuning out the leakage reactance of the transformer arrangement, so that as the current in the secondary circuit varies the voltage across the series tuning arrangement remains substantially constant between the input terminals 6—6 of the transmission line. With the quarter wave transmission line or its equivalent, the current at the load then remains substantially constant regardless of variations in the load impedance.

It is preferable in many instances to make the transmission line itself less than ¼ wavelength long, in which case the phase shift in the line proper is made less than 90 degrees. With this arrangement, the remainder of the electrical length of the line may be provided by a lumped network 31, connected at the load end of the transmission line in Figure 3. If $\rho$ is made equal to the length of the actual transmission line, then the inductance $L_1$, in microhenries, is chosen from the formula $$2\pi fL = Z_c \sin (90-\rho) = Z_c \cos \rho \qquad (4)$$

where $f$ is the frequency in megacycles, and $Z_c$ is the characteristic impedance of the transmission line. The capacity C which occurs at two places in the network, as at 33 and 34, with a series inductance 35 therebetween, is determined from the relation $$\frac{10^6}{2\pi fC} = \frac{Z_c \sin (90-\rho)}{1-\cos (90-\rho)} = \frac{Z_c \cos \rho}{1-\sin \rho} \qquad (5)$$

where C is in micromicrofarads, and $f$ is in megacycles.

The inductance 35 or $L_2$ may be the inductance inherent in the electrodes and connections thereto or in the high voltage electrode of the system, and the shunt capacities 33 and 34, $C_2$ and $C_3$, may be the stray capacities existing between the high voltage electrode connections and the frame or ground at the end of the transmission line.

In the modification shown in Figure 4, the upper electrode 38 engages the upper layer 39 of the two layer dielectric material load, having a lower layer 40, which moves along the grounded platen or table 41 with the lower or high voltage electrode 42 mounted on an insulating hub 43, and connected through an insulated brush contact 44 with the central conductor 12 of the transmission line. The upper electrode is connected to the grounded outer conductor 13 of the transmission line which in turn is connected through a lead 45 to ground 47, along with the platen 41.

The stray capacities $C_2$ and $C_3$ are indicated in dotted outline in Figure 4 and the inductance $L_2$ is likewise indicated by the outer conducting tire or conductor of the lower electrode. This is the usual arrangement in an electric sewing machine or bonding apparatus for the continuous bonding of one or more layers of thermoplastic dielectric material. As such systems are at present well known, further description is believed to be unnecessary regarding the mechanical operation thereof.

If, for example, the actual length, $\rho$, of the line is chosen to be 60 degrees, that is, the transmission line is one-sixth wavelength in length, and if it is assumed that $Z_c$ is 75 ohms, from Equation 4, $$2\pi fL = 75 \times 0.5 = 37.5 \text{ ohms}$$

For a frequency of 60 megacycles, therefore, L is 0.1 microhenry. From Equation 5 the required capacity C is 9.5 micro-microfarads.

It is preferable generally to use a transmission line length of approximately one-eighth wavelength, so that L will have a value of 0.14 microhenry and C would have a value of 14.7 micro-microfarads. This arrangement is desirable for the reason that a portion of the stray capacity $C_2$—$C_3$ at the electrodes, may be lumped with the last capacity in the network or in other words, the last capacity at the end of the section may be given a value equal to C less the stray capacity. This insures constant current into the work rather than constant current into the work and the stray capacitance.

In any case, however, by means of the tuned series resonant input coupling to the generator for the input end of the transmission line, a constant voltage input may be provided while, with an overall electrical length of transmission connection, including the transmission line proper, as an odd multiple of ¼ wavelength, the variable impedance load may receive at all times a constant current. Furthermore, with this arrangement, the actual length of transmission line may be considerably shortened by providing a lumped network at the output end of the transmission line in connection with the work load or the electrodes between which the material passes, and by including the stray capacity and inductance of the electrodes in determining the proper overall capacity for the system. Thus, with varying thicknesses of dielectric material between the electrodes or variation in dielectric constant providing a variable impedance load, constant current and effective bonding of the material is assured without manual operation or attention and entirely automatically.

I claim as my invention:

1. In a high frequency dielectric heating system, the combination with a constant voltage power source and a pair of work applicator electrodes, of a transmission line coupling said electrodes and power source, a series tuned circuit to a portion of which said power source is loosely coupled, said series tuned circuit being at the input end of said transmission line for applying to the input end thereof substantially a constant operating voltage from the power source, the length of said transmission line being less than one-quarter wavelength of the operating frequency of said power source, and a lumped network connected between the output end of said line and said electrodes for imparting to said coupling connection between the power source and said electrodes an electrical length of substantially one-quarter wavelength of the operating frequency of said power source, whereby a substantially constant load current is maintained between said electrodes despite variations in the load impedance presented between said electrodes.

2. In a high frequency dielectric heating system, the combination as defined in claim 1, wherein said lumped network includes the inductance of one of said electrodes and the stray capacity between said electrode and ground for the system.

3. A high frequency dielectric heating system comprising in combination, a constant voltage R.-F. generator, a variable impedance load, a transmission line coupling said generator and load, the effective length of said transmission line being less than an odd multiple of one-quarter wavelength at the operating frequency of said generator, series resonant circuit means at the input end of said transmission line, said generator being loosely coupled to said series resonant circuit means for applying to said line substantially a constant voltage input, whereby the output current to said variable impedance load is maintained substantially constant in operation, and a lumped network between said load and the output end of said transmission line supplementing said transmission line to provide an overall effective electrical length for said transmission line which is substantially an odd multiple of one-quarter wavelength at said operating frequency.

4. A high frequency dielectric heating system for bonding multiple layers of thermoplastic dielectric material, comprising in combination, a pair of spaced electrodes for engaging a movable laminated body of dielectric material of varying thickness providing a variable impedance load therebetween, means for applying current to said electrodes including a transmission line having its output terminals connected therewith, a series resonant circuit comprising an inductance and a capacitance connected in series with each other, said series resonant circuit being connected across the input terminals of said transmission line, a high frequency constant voltage generator loosely coupled to said inductance to maintain substantially a constant input potential on said line, and the electrical length of said line, including the inductance and stray capacity of said electrodes, being substantially an odd multiple of one-quarter wavelength at the operating frequency of said generator, whereby substantially constant load current is maintained through said load despite variations in the load impedance caused by variations in the number and dielectric constant of the laminations of said material moving between said electrodes.

GEORGE H. BROWN.

REFERENCES CITED

The following references are of record in the file of this patent:

UNITED STATES PATENTS

| Number | Name | Date |
|---|---|---|
| 2,138,161 | Hansell | Nov. 29, 1938 |
| 2,142,313 | Heising | Jan. 3, 1939 |
| 2,175,694 | Jones | Oct. 10, 1939 |
| 2,274,347 | Rust et al. | Feb. 24, 1942 |
| 2,432,412 | Hacklander | Dec. 9, 1947 |
| 2,451,910 | Bock | Oct. 19, 1948 |
| 2,453,680 | Sweeny | Nov. 9, 1948 |
| 2,526,846 | Bowman | Oct. 24, 1950 |
| 2,529,560 | Larys | Nov. 14, 1950 |

FOREIGN PATENTS

| Number | Country | Date |
|---|---|---|
| 375,587 | Great Britain | June 30, 1932 |